US010396556B2

(12) United States Patent
Cruz

(10) Patent No.: US 10,396,556 B2
(45) Date of Patent: Aug. 27, 2019

(54) 120VAC TO 240VAC POWER CONVERTER, ADAPTER AND METHODS OF USE

(71) Applicant: Q Factory 33 LLC, Encinitas, CA (US)

(72) Inventor: Paul Cruz, San Diego, CA (US)

(73) Assignee: Q Factory 33 LLC, Encinitas, CA (US)

( * ) Notice: Subject to any disclaimer, the term of this patent is extended or adjusted under 35 U.S.C. 154(b) by 571 days.

(21) Appl. No.: 14/519,103

(22) Filed: Oct. 20, 2014

(65) Prior Publication Data

US 2016/0111876 A1 Apr. 21, 2016

(51) Int. Cl.
*H02J 3/06* (2006.01)
*H02J 3/12* (2006.01)
*H02J 3/26* (2006.01)

(52) U.S. Cl.
CPC . *H02J 3/12* (2013.01); *H02J 3/06* (2013.01); *H02J 3/26* (2013.01); *Y02E 40/50* (2013.01)

(58) Field of Classification Search
CPC ....... H02J 3/06; H02J 3/12; H02J 3/26; Y02E 40/50
See application file for complete search history.

(56) References Cited

U.S. PATENT DOCUMENTS 2,508,637 A * 5/1950 Bolesky ............... H01R 13/713 337/113
3,697,771 A * 10/1972 Colt ........................ A47L 11/34 307/154
3,748,541 A * 7/1973 Ginsberg .................. F16P 3/20 307/113
3,793,533 A * 2/1974 Ginsberg ............... B21D 55/00 307/113
3,991,320 A * 11/1976 Ross .................... H02H 11/007 307/147

(Continued)

OTHER PUBLICATIONS

Terri Steele, "The Unsung Hero of Solar Power International," Nov. 1, 2014: http://theecoreport.com/the-unsung-hero-of-solar-power-international/.

(Continued)

*Primary Examiner* — Pinping Sun
(74) *Attorney, Agent, or Firm* — Knobbe, Martens, Olson & Bear, LLP

(57) ABSTRACT

The present invention is directed, in part, to electrical components and methods of use associated with such components. In particular, the invention relates to an electrical device and methods of converting the use of 120 VAC electrical power into 240 VAC electrical power in order to power 240 VAC-requiring equipment and appliances. The electrical system includes at least two 120 VAC electrical cords and plugs, at least one 240 VAC outlet, a plurality of electrical switches and coils managed by a plurality of electrical relays within a central housing unit. The housing unit includes hot side, neutral side and ground wiring that transfer 120 VAC electrical power through the plurality of switches so that the power is safely routed to a 240 VAC outlet for use in powering 240 VAC-requiring equipment and appliances. As a safety feature, the invention further includes a plug circuit breaker that will break the electrical circuit within either a 120 VAC or 240 VAC plug.

17 Claims, 7 Drawing Sheets

(56) References Cited

U.S. PATENT DOCUMENTS

| | | | | |
|---|---|---|---|---|
| 4,315,163 | A * | 2/1982 | Bienville | H02J 9/04 136/248 |
| 5,160,852 | A | 11/1992 | Charles et al. | |
| 5,206,777 | A | 4/1993 | Clarey | |
| 5,245,219 | A * | 9/1993 | Romatzick, Jr. | H02H 11/00 307/130 |
| 5,302,857 | A | 4/1994 | Charles et al. | |
| 5,345,360 | A * | 9/1994 | Crane | H01H 47/226 361/160 |
| 5,936,828 | A * | 8/1999 | Nolan | H02H 11/00 307/71 |
| 5,977,658 | A | 11/1999 | Hoole | |
| 6,417,651 | B1 * | 7/2002 | Kronberg | G05F 1/14 323/255 |
| 7,408,273 | B2 | 8/2008 | Slocum | |
| 7,528,504 | B2 | 5/2009 | Gerber | |
| 7,541,784 | B2 * | 6/2009 | Davis | H02P 9/007 320/123 |
| 7,612,469 | B2 * | 11/2009 | Kuo | H02J 9/06 307/64 |
| 7,824,191 | B1 | 11/2010 | Browder | |
| 7,977,818 | B1 | 7/2011 | Wahl | |
| 8,138,430 | B1 * | 3/2012 | Ucero | H02B 1/52 174/480 |
| 8,350,417 | B1 | 1/2013 | Dooley | |
| 8,598,445 | B2 | 12/2013 | Schroeder | |
| 8,700,224 | B2 | 4/2014 | Mathiowetz | |
| 2007/0184696 | A1 | 8/2007 | Melot et al. | |
| 2008/0025058 | A1 * | 1/2008 | Gerber | H02J 3/44 363/156 |
| 2009/0015073 | A1 * | 1/2009 | Lloyd | H01P 1/15 307/112 |
| 2009/0318032 | A1 * | 12/2009 | Eguchi | H02H 3/12 439/660 |
| 2011/0316341 | A1 * | 12/2011 | Pichkur | H01R 13/6675 307/72 |
| 2012/0281444 | A1 | 11/2012 | Dent | |
| 2016/0094138 | A1 | 3/2016 | Hoole | |
| 2016/0241039 | A1 * | 8/2016 | Cheng | H02J 3/383 |

OTHER PUBLICATIONS

International Search Report and Written Opinion issued in PCT/US2014/38492 dated Sep. 22, 2014.

International Search Report and Written Opinion issued in PCT/2014/0053448 dated Dec. 18, 2014.

* cited by examiner

120VAC TO 240VAC POWER CONVERTER, ADAPTER AND METHODS OF USE

FIELD OF THE INVENTION

The present invention relates generally to electrical components and methods of use associated with such components. In particular, the invention relates to an electrical device and improved method of utilizing 120 VAC power, generally accessible in a home or commercial building, and transferring such power for use in powering devices that require 240 VAC power. Specifically, the invention is an electrical device that employs two 120 VAC cords and outlet plugs to transfer 120 VAC power through a series of relays and coils in order to power 240 VAC load requiring appliances and equipment.

BACKGROUND OF THE INVENTION

Traditionally, home and business establishments are generally constructed with a majority of 120 VAC power outlets, with 240 VAC power outlets installed more sparingly due to the fact that 240 VAC power requiring devices are less common in the home or in most business environments. Nonetheless, more and more, most modern clothes dryers as well as many other home appliances have greater power requirements forcing consumers to find solutions to the general lack of 240 VAC outlets in most homes.

Further, the advancement of electrical and battery technology in the automobile industry has brought further challenges to consumers who seek affordable and easy ways of charging the batteries of their plug-in automobiles. Although modern plug-in automobiles generally can be charged employing 120 VAC power outlets, the process often requires hours of charging time, most often requiring consumers to charge their vehicle batteries overnight in order to get and keep adequate charge for the following day's commute.

One well known route in enabling the use of 120 VAC power for 240 VAC needs arises in the use of so-called "step-up" transformers or converters. However, such technology only acts to transform DC power to AC, or vice versa. Boost or "step-up" and "step-down" converters include for example, a DC to DC power converter that allows an output voltage greater than its input voltage. The technology generally exists as a class of switched mode power supply (SMPS) containing at least two semiconductors (a diode and a resistor) and at least one energy storage element, such as for example a capacitor, inductor or a combination of the two. Filters made of capacitors, sometimes in combination with inductors, are normally added to the output of the converter to reduce output voltage to ripple.

AC to DC power converters with PFC capability are also desirable in some applications including for example, in laptop and desktop computers or other electronic devices. For instance, U.S. Pat. No. 7,746,040 describes an input shaping AC to DC converter with PFC front end that reduces harmonic components.

U.S. Pat. No. 4,386,394 to Kocher describes a single phase and three phase AC to DC converter. In particular, the patent discloses a single phase AC to DC power converter that accepts a single AC line input voltage and provides a DC output voltage. Input current feedback is used to control the converter and to provide sinusoidal line currents in phase with the applied line voltage. The patent also describes a three phase AC to DC converter as a delta connection of three isolated single phase e. In another embodiment, a three phase AC to DC converter is realized as a delta connection of three isolated single phase AC to DC converters. Reduction in peak transistor currents of the switching transistor in each single phase converter is accomplished by the introduction of third harmonics to each of the single phase AC to DC power converters, Each of the three single phase AC to DC converters are synchronized so that the current pulses at the outputs of the three AC to DC converters are staggered in time reducing the amount of filtering required at the load. However, the device fails to provide a means which allows a user to access 240 VAC in the circumstance in which only 120 VAC power is available The invention detailed herein is intended to solve a problem faced by homeowners and workers in many professions: Namely, how can a user power equipment that requires 240 VAC in a space that is wired to provide only 120 VAC. As known in the art, VAC is short for Volts of Alternating Current. Alternating current refers to the fact that in the U.S. electrical power is distributed so that the voltage on any supply line is not constant but varies up and down sinusoidally, assuming both positive and negative values in a pattern that repeats 60 times per second. As the voltage varies, so does the current, which is the flow of electrons; thus the term alternating current. Also, one may sometimes see distribution voltages quoted as 110 VAC and 220 VAC.

Utilities have a degree of leeway in the voltages they provide, both as a policy and as a hedge against severe load conditions. When consumers are demanding more electrical power than the utility can provide, one strategy is to reduce the voltage on the distribution grid, thus supplying everyone with slightly less power uniformly. This gives rise to the term "brown-out". Another strategy that comes into play occurs when a utility wishes to increase the power distribution capacity of its grid without installing thicker and more expensive wires, they may choose to raise the supplied voltage. This is done very slowly, over years or decades, as older, lower voltage consumer equipment is replaced. In any case, for the purpose of this application and specification, 120 VAC is synonymous with 120 VAC and 240 VAC is synonymous with 240 VAC; the invention works the same for any voltages within that range.

Electrical power from utilities in the U.S. commonly is provided as two separate 120 Volt circuits. This is true in essentially all residential homes and apartments, nearly all white-collar businesses, and even in factory spaces where the need for large amounts of electrical power has not been anticipated. The reason for this actually lies with utility customers that have heavy industrial electric power requirements. For supply of large amounts of electrical power, three electrical circuits are provided. This is not simply to have an additional electrical conductor, but instead, with three circuits, it is possible to arrange the relative phases of the three circuits (the points in time where the supplied voltage peaks) each one-third of a cycle apart so that the power available to equipment is constant, not varying up and down 60 times per second with the voltage. This is not possible with any arrangement of one or two AC circuits. For customers that do not require large amounts of uniform power, two of the three phases are routed to their home or business. By distributing different pairs of phases to various locations, the total amount of power supplied by all phases remains balanced.

Though two electrical power phases are wired to nearly all homes and businesses, common wall outlets all provide 120 VAC. Again, to maintain balance in the distribution system, some outlets are wired to one phase and some are wired to another phase. Over many outlets and customer locations, the load will be balanced. Occasionally, one may see in a home or business an outlet of a different design that is wired to both phases and can supply 240 VAC. Typically, in a home, this can be found where an electric clothes dryer, for example, are installed. This outlet is specifically designed not to accept plugs from equipment intended for 120 VAC since that would almost certainly damage the equipment and potentially create a risk of electrical fire.

In attempting to address these shortcomings, the electrical industry has responded with technology that hopes to assist consumers in better utilizing existing electrical infrastructure for higher power-demanding equipment and appliances. To date however, shortcomings in the addressing these needs remain.

The problem the present invention is intended to address arises when a homeowner or business person wishes to operate a piece of equipment that requires 240 VAC but only 120 VAC outlets are available for use. Some homes and many businesses are constructed without any 240 VAC outlets, particularly if they are older. In other cases, the 240 VAC outlet that is available may already be occupied by another piece of equipment, or may be in an inconvenient location. A rapidly growing requirement for 240 VAC comes from electric vehicle quick-chargers. These accessories allow the vehicles' batteries to be recharged in about half the time taken by 120 VAC charging. Other common equipment that can require 240 VAC includes welders, heaters, compressors, and large motors such as on wood chippers.

One might expect that if some outlets in a home are wired to one 120 VAC phase and some are wired to another phase, it would be a simple matter for the homeowner to combine them however, any attempt to do this by an untrained person is likely to result in situations ranging from blowing electrical breakers to fires to electrocution. Even trained professionals need to make careful measurements before proceeding. In addition, having a professional install a new 240 VAC outlet can be prohibitively expensive.

The present invention further employs electrical relays which are generally known in the art however, the following provides a general description of electrical relays that are encompassed within the present invention. The list is not exhaustive and other electrical relays known in the art and not described herein are also encompassed within the scope of the invention.

When an electric current is passed through the coil it generates a magnetic field that activates the armature, and the consequent movement of the movable contact(s) either makes or breaks (depending upon construction) a connection with a fixed contact. If the set of contacts was closed when the relay was de-energized, then the movement opens the contacts and breaks the connection, and vice versa if the contacts were open. When the current to the coil is switched off, the armature is returned by a force, approximately half as strong as the magnetic force, to its relaxed position. Usually this force is provided by a spring, but gravity is also used commonly in industrial motor starters. Most relays are manufactured to operate quickly. In a low-voltage application this reduces noise; in a high voltage or current application it reduces arcing.

When the coil is energized with direct current, a diode is often placed across the coil to dissipate the energy from the collapsing magnetic field at deactivation, which would otherwise generate a voltage spike dangerous to semiconductor circuit components. Some automotive relays include a diode inside the relay case. Alternatively, a contact protection network consisting of a capacitor and resistor in series (snubber circuit) may absorb the surge. If the coil is designed to be energized with alternating current (AC), a small copper "shading ring" can be crimped to the end of the solenoid, creating a small out-of-phase current which increases the minimum pull on the armature during the AC cycle.

A latching relay (also called "impulse", "keep", or "stay" relays) maintains either contact position indefinitely without power applied to the coil. The advantage is that one coil consumes power only for an instant while the relay is being switched, and the relay contacts retain this setting across a power outage. A latching relay allows remote control of building lighting without the hum that may be produced from a continuously (AC) energized coil.

In one mechanism, two opposing coils with an over-center spring or permanent magnet hold the contacts in position after the coil is de-energized. A pulse to one coil turns the relay on and a pulse to the opposite coil turns the relay off. This type is widely used where control is from simple switches or single-ended outputs of a control system, and such relays are found in avionics and numerous industrial applications.

Another latching type has a remanent core that retains the contacts in the operated position by the remanent magnetism in the core. This type requires a current pulse of opposite polarity to release the contacts. A variation uses a permanent magnet that produces part of the force required to close the contact; the coil supplies suffienct force to move the contact open or closed by aiding or opposing the field of the permanent magnet. A polarity controlled relay needs changeover switches or an H brig drive circuit to control it. The relay may be less expensive than other types, but this is partly offset by the increased costs in the external circuit.

In another type, a ratchet relay has a ratchet mechanism that holds the contacts closed after the coil is momentarily energized. A second impulse, in the same or a separate coil, releases the contacts. This type may be found in certain cars, for headlamp dipping and other functions where alternating operation on each switch actuation is needed.

All three of these basic types of latching relay are currently available and widely used. A stepping relay is a specialized kind of multi-way latching relay designed for early automatic telephone exchanges. An earth leakage circuit breaker includes a specialized latching relay. Very early computers often stored bits in a magnetically latching relay, such as ferreed or the later memreed in the lESS switch.

A reed relay is a reed switch enclosed in a solenoid. The switch has a set of contacts inside an evacuated or inert gas-filled glass tube which protects the contacts against atmospheric corrosion; the contacts are made of magnetic material that makes them move under the influence of the field of the enclosing solenoid or an external magnet.

Reed relays can switch faster than larger relays and require very little power from the control circuit. However, they have relatively low switching current and voltage ratings. Though rare, the reeds can become magnetized over time, which makes them stick 'on' even when no current is present; changing the orientation of the reeds with respect to the solenoid's magnetic field can resolve this problem.

Sealed contacts with mercury-wetted contacts have longer operating lives and less contact chatter than any other kind of relay. The mercury-wetted relay has one particular advantage, in that the contact closure appears to be virtually instantaneous, as the mercury globules on each contact coalesce. The current rise time through the contacts is generally considered to be a few picoseconds, however in a practical circuit it will be limited by the inductance of the contacts and wiring. It was quite common, before the restrictions on the use of mercury, to use a mercury-wetted relay in the laboratory as a convenient means of generating fast rise time pulses, however although the rise time may be picoseconds, the exact timing of the event is, like all other types of relay, subject to considerable jitter, possibly milliseconds, due to mechanical imperfections.

The same coalescence process causes another effect, which is a nuisance in some applications. The contact resistance is not stable immediately after contact closure, and drifts, mostly downwards, for several seconds after closure, the change perhaps being 0.5 ohm.

A mercury relay is a relay that uses mercury as the switching element. They are used where contact erosion would be a problem for conventional relay contacts. Owing to environmental considerations about significant amount of mercury used and modern alternatives, they are now comparatively uncommon.

A polarized relay places the armature between the poles of a permanent magnet to increase sensitivity. Polarized relays were used in middle 20th Century telephone exchanges to detect faint pulses and correct telegraphic distortion. The poles were on screws, so a technician could first adjust them for maximum sensitivity and then apply a bias spring to set the critical current that would operate the relay.

A machine tool relay is a type standardized for industrial control of machine tools, transfer machines, and other sequential control. They are characterized by a large number of contacts (sometimes extendable in the field) which are easily converted from normally-open to normally-closed status, easily replaceable coils, and a form factor that allows compactly installing many relays in a control panel. Although such relays once were the backbone of automation in such industries as automobile assembly, the programmable logic controller (PLC) mostly displaced the machine tool relay from sequential control applications.

A contactor is a heavy-duty relay used for switching electric motors and lighting loads, but contactors are not generally called relays. Continuous current ratings for common contactors range from 10 amps to several hundred amps. High-current contacts are made with alloys containing silver. The unavoidable arcing causes the contacts to oxidize; however, silver oxide is still a good conductor. Contactors with overload protection devices are often used to start motors. Contactors can make loud sounds when they operate, so they may be unfit for use where noise is a chief concern.

A contactor is an electrically controlled switch used for switching a power circuit, similar to a relay except with higher current ratings. A contactor is controlled by a circuit which has a much lower power level than the switched circuit.

A solid state relay or SSR is a solid state electronic component that provides a similar function to an electromechanical relay but does not have any moving components, increasing long-term reliability. A solid-state relay uses a thyristor, TRIAC or other solid-state switching device, activated by the control signal, to switch the controlled load, instead of a solenoid. An optocoupler (a light-emitting diode (LED) coupled with a photo transistor) can be used to isolate control and controlled circuits.

As described herein, the present invention addresses a long standing need and enables a user to convert 120 VAC power, available in any home or structure, so that the power can be used and routed to a 240 VAC outlet to power 240 VAC requiring devices and appliances. With increased use of charging equipment the need to use 120 VAC available power has similarly risen. Presently, plug-in vehicles for example, can be charged using a single 120 VAC outlet however, the charging process is lengthy and often impractical. 240 VAC available power would greatly decrease charging time for plug-in hybrid vehicles however, very few homes or structures are equipped with 240 VAC outlets that aren't already being used for some other dedicated piece of equipment such as a washer, dryer or refrigerator. In other words, even when a home or structure possesses 240 VAC outlets, there are very few available for use. And those that are present are typically dedicated to 240 VAC requiring appliances once the home is built, leaving individuals no 240 VAC available for a user such as for example, in charging a plug-in vehicle or other charged piece of equipment.

Accordingly, difficulties in the field of electrical devices that enable the use of 120 VAC power as a means for powering 240 VAC power requiring devices remain. Existing solutions fail to address particular deficiencies that confront businesses and consumers seeking alternatives to the existing art and a solution to advancing cost and time saving measures for greater implementation of energy options remains elusive. The present invention seeks to address these shortcomings.

SUMMARY OF THE INVENTION

The present invention is directed to a novel electrical system and device that simplifies the process of combining two, or three, electrical phases so that anyone can do so safely and easily. The nominal configuration of the invention is as a modest-sized box, or central housing unit, with three power cords coming out of a main section. The central housing unit can optionally be fitted with two 120 VAC outlets and one 240 VAC outlet, lacking the three electrical cords altogether.

In the preferred embodiment in which cords are provided, two of the cords are identical and end in a conventional three-pronged 120 VAC electrical plugs. The third cord ends in a 240 VAC outlet. There is some variation in the design of 240 VAC outlets installed in homes, and also among the types of 240 VAC plugs found on electric vehicle quick-chargers. As an added safety measure, the invention further includes a plug circuit breaker wherein the circuit breaker is configured within the wiring of the electrical cords so that if heat becomes excessive, or there is an overload of the wiring, the circuit is broken by means of the circuit breaker.

The 240 VAC outlet on the invention is supplied as a configurable design that will accommodate all 240 VAC plugs. To use, the homeowner plugs one 120 VAC cord into a 120 VAC outlet in the home, and the other 120 VAC cord into a 120 VAC outlet on the other electrical phase. There is no straightforward way of telling which household outlets are wired to which phases, short of physically tracing wires from the breaker box to the outlets. Therefore, a trial and error process is employed. One cord is plugged into any outlet, and then the other cord is tried at various outlets throughout the home until 240 VAC power becomes available at the output outlet. To simplify this process, one or both of the 120 VAC plugs of the invention are equipped with an indicator lamp that illuminates when the two plugs have been connected to two different phases. Typically, the 120 VAC cords supplied with the present invention will be long enough to span from one end of a house to the other if necessary.

In an alternate embodiment, the present invention may be implemented with only a central housing unit with no attached cords, just two male 120 VAC plugs and a 240 VAC outlet. As part of this alternative embodiment, the user supplies his own power cords. In this case, the present invention will give off a short audible tone or other indication when each inlet has been connected to a different phase. Other configurations of the present invention are possible in which one or two cords, in any combination, are captive to the unit.

The invention further includes the ability to employ the electrical system for alternative energy generation in the home as it relates to Plug-n-Play technology. As is known in the art, adding photovoltaic solar power generation to an existing house is an expensive undertaking; a significant portion of the cost is the contractor labor for installation of the solar panels and the associated wiring. While solar panels are readily available to individual homeowners and relatively inexpensive, such equipment cannot be connected to the utility power grid for one simple fact: utility power is distributed to homes as two electrical phases and it is beyond the ability of the typical homeowner to properly connect their solar panels to the grid in a way that balances power into both phases. This is a primary aspect of solar installation that requires the expertise of an experienced contractor. Connecting home-generated solar electric power in a manner that is not balanced between the two phases is not permitted by the utility, and could potentially disrupt power distribution both inside and beyond the house.

Therefore, the present invention further handles the task of connecting solar electric power to an existing home wiring scheme, as well as the utility grid, in a balanced way, in most cases eliminating the need for an installation contractor altogether. By way of example, in the instance in which a homeowner sets up one or more solar panels in his backyard and connects the invention electrical system to the solar panel assembly, electrical output generated by solar panels, or other alternative energy sources, to a Plug-and-Play, connect the Plug-and-Play to the home's standard electrical outlets, and safely begin generating solar power. The present invention electrical system combines the two 120 V phases supplied to a house into a single 240 V supply for equipment that requires it. The Plug-and-Play embodiment of the invention in this instance, acts in reverse, taking the single phase output of the solar panel system and evenly distributing it to both 120 V phases supplied to the home. This allows all electrical circuits in the home to distribute the generated solar electricity, and makes the power suitable for sale back to the utility's distribution grid.

In a preferred embodiment of the invention comprises an electrical system that includes at least two electrical cords configured with at least two 120 VAC electrical cords and plugs, one 240 VAC electrical outlet, the at least two 120 VAC cords and plugs being operably connected to the 240 VAC electrical outlet via a plurality of electrical relays, the three electrical switches, one or more ground wires, one or more neutral wires and one or more supply wires. The electrical system routes 120 VAC power into 240 VAC power so that such power can be used to operate 240 VAC power requiring equipment. The electrical system further includes a first electrical relay that manages a first set of switches that are operably connected to a first 120 VAC cord and plug. The electrical system further includes a second electrical relay that manages a second set of switches operably connected to a second 120 VAC cord and plug. The electrical system includes a third electrical relay that manages a third set of switches operably connected to said 240 VAC cord and outlet, wherein the power coming from the first and second 120 VAC cords and plugs are routed from 120 VAC electrical outlets that transfer power in alternate and opposite electrical supply phases. The power from the first and second 120 VAC outlets is routed to the correct prong receivers on the 240 VAC outlet and allows a user to connect the 240 VAC electrical outlet to a 240 VAC power-requiring piece of electrical equipment thereby providing power to the 240 VAC power-requiring piece of electrical equipment.

The electrical system includes a 240 VAC electrical outlet that is configured to fit a standard 240 VAC plug or alternatively to any type of 240 VAC plug as known in the art.

The electrical system of the invention operates in part when the first electrical relay closes the first set of switches when the first 120 VAC electrical plug is plugged into an active 120 VAC power-producing outlet. Thereafter, the electrical system employs the second electrical relay to close the second set of switches when the second 120 VAC electrical plug is plugged into an active 120 VAC power-producing outlet wherein the supply phase of said first 120 VAC electrical relay is opposite of the supply phase of said second 120 VAC electrical relay. The electrical system also includes a third electrical relay that closes the third set of switches in response to the closing of the switches on the first and second 120 VAC electrical relays.

The electrical system can also be configured to lack the 120 VAC electrical cords and plugs and instead allows a user to install a first and second external 120 VAC cord to connect the electrical system to 120 VAC outlets in a home wherein the 120 VAC outlets are in different, opposite electrical phases. In particular, the electrical system of the invention is configured according to any one of FIG. 1, 2, 3 or 4. The electrical system can also be configured with a plug circuit breaker as provided in any of FIGS. 5 through 8.

The plug circuit breaker of the invention will include a reset button wherein the reset button, when pushed, closes electrical contacts to establish an electrical connection and the plug circuit breaker breaks an established electrical circuit during instances in which excessive heat is generated, the heat being in excess of safe operating levels. Finally, the electrical system can be configured with a traditional alternative energy plug and play device wherein power generated from the plug and play device is routed to a home in need of such power or alternatively, the power can be backfed to the electrical grid.

The invention also includes a method of supplying 240 VAC electrical power to 240 VAC requiring-appliances by employing an electrical system that routes 120 VAC power to 240 VAC accessible power. The method and electrical system includes at least two 120 VAC electrical cords and plugs, at least one 240 VAC electrical outlet. The two 120 VAC cords and plugs are operably connected to the 240 VAC electrical outlet via a plurality of electrical relays, at least three electrical switches, one or more ground wires, one or more neutral wires and one or more supply wires. The electrical system routes 120 VAC power into 240 VAC power so that such power can be used to operate 240 VAC power requiring equipment.

For the method, the electrical system includes a first electrical relay that manages a first set of switches operably connected to a first 120 VAC cord and plug. The electrical system further includes a second electrical relay that manages a second set of switches operably connected to a second 120 VAC cord and plug. The electrical system includes a third electrical relay that manages a third set of switches operably connected to said 240 VAC cord and outlet, wherein the power coming from the first and second 120 VAC cords and plugs are routed from 120 VAC electrical outlets that transfer power in alternate and/or opposite electrical supply phases. The power from the first and second 120 VAC outlets is routed to the correct prong receivers on the 240 VAC outlet, wherein a user connects the 240 VAC electrical outlet to a 240 VAC power-requiring piece of electrical equipment thereby providing power to said 240 VAC power-requiring piece of electrical equipment. The method includes the steps of a user plugging a first 120 VAC cord and plug into a first 120 VAC outlet on a first electrical phase, and a second 120 VAC cord and plug into a second 120 VAC outlet on a second electrical phase. The user determines if 240 VAC power is being supplied to the 240 VAC power-requiring piece of equipment by observing an indicator light on said electrical system wherein an activated light indicates the electrical system is providing 240 VAC power and an inactive light indicates there is a lack of 240 VAC power being provided by the electrical system.

The method further includes the first and second 120 VAC electrical cords so that the cords are of sufficient length to span a distance within a home or establishment so that the electrical cords can be plugged into two 120 VAC electrical that operate on different electrical phases.

The method and steps of the electrical system are further characterized by the following:

a. no voltage appears at the 240 VAC outlet until both input plugs are connected to different supply phases;

b. when one of said first 120 VAC plugs is connected to a 120 VAC producing outlet and said second 120 VAC plug is not, no voltage appears on the prongs of the unconnected plug;

c. while in use, both supply phases, said one or more neutral wires from both phases, and said one or more ground wires from both phases, are routed to the correct prong receivers on the 240 VAC outlet;

d. if, while during use, one 120 VAC plug becomes disconnected from its supply, all power at the 240 VAC outlet is disconnected.

The method is further characterized by the electrical system illustrated in any one of FIG. 1, 2, 3 or 4. The method includes employing the electrical system to charge an electric vehicle wherein the method includes a user plugging the first and second 120 VAC plugs and cords into the first and second 120 VAC producing outlets ensuring that the first and second 120 VAC producing outlets supply power in opposite electrical phases. The method further includes employing the electrical system to route power generated by one or more alternative energy devices to a home or to backfeed power to an electrical power grid connected to said electrical system, the alternative energy devices including for example a solar panel, wind turbine or electrical power generator. The method further includes employing the electrical system wherein the system is electrically connected to an alternative energy plug and play device wherein power generated from the plug and play device is routed to a home in need of electrical power or alternatively, routed to an electrical power grid.

Use of the present invention wherein solar panels are set up in the yard remain portable for use in multiple locations, and can be taken in when potentially damaging hail or wind threaten. Do-it-yourself users can perform their own rooftop installations, relying on the Plug-and-Play to handle the complexities of the electrical connections.

When used in a typical manner, there are four functions provided by the present invention during the connection process and while in use in order to convert 120 VAC available power to 240 VAC power:

1) No voltage appears at the 240 VAC outlet until both 120 VAC input plugs are connected to different supply phases. To do otherwise would risk damaging any attached equipment.

2) When one 120 VAC plug is connected to an outlet and the other 120 VAC plug is not, no voltage appears on the prongs of the unconnected 120 VAC plug. To do otherwise would risk electrical shock to the user.

3) While in use, both supply phases, the neutral wires from both phases, and the ground wires from both phases are routed to the correct prong receivers on the 240 VAC outlet.

4) If, while during use, one 120 VAC plug becomes disconnected from its supply, all power at the 240 VAC outlet is disconnected. To do otherwise would risk damaging any attached equipment. This is true whether the plug is pulled from its socket or the electrical breaker on its circuit trips. Further, if one 120 VAC plug is disconnected, there will be no voltage present on any of its prongs.

Operation of the present invention can be understood with the help of the attached figures. All figures provide electrical schematics of the internal and external components of the invention and their interconnections. Figures show these components, specifically the relay contacts, in different operational states. As an added safety measure, the invention is configured with an electrical plug circuit breaker to prevent overheating and diminishing the risk of fire due to such overheating.

DETAILED DESCRIPTION OF THE INVENTION

Figure 1:
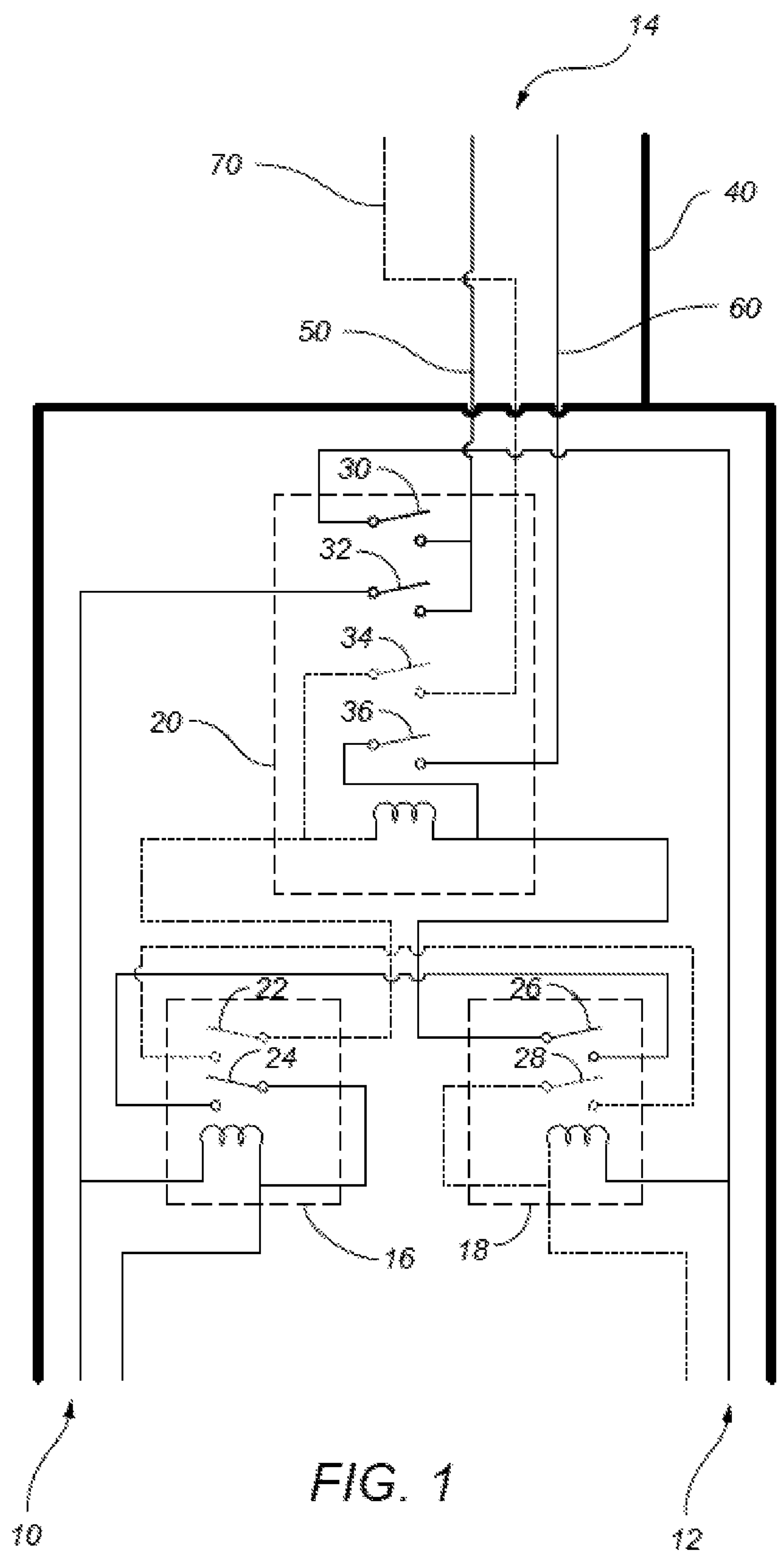
FIG. 1 depicts the overall configuration of the present invention. In particular, the illustration provides the electrical schematic associated with transfer of electrical power from two 120 VAC cord and plug connections to a 240 VAC outlet. As shown, switches controlled by electrical relays are in an open position.

The present invention is directed to a novel device and methods of providing 240 VAC power in situations in which only 120 VAC power outlets are available for use. In particular, the invention is an electrical system that allows the use of 120 VAC power in a home, building or other structure, to be converted into 240 VAC power for use in powering 240 VAC-requiring equipment, appliances or otherwise.

The electrical system includes a central unit that houses at least two 120 VAC cords and plugs and a 240 VAC cord configured with a 240 VAC outlet. The electrical system further includes a plurality of coils, electrical relays and switches that allow the conversion and transfer of 120 VAC power so that it can be used as 240 VAC power for higher power requiring equipment and appliances. In particular, the invention includes at least two 120 VAC relays that manage the power of 120 VAC entering the central housing unit via at least two 120 VAC electrical outlets and plugs. A first 120 VAC relay manages the power routed from a first 120 VAC cord and plug wherein the plug is plugged into a 120 VAC outlet in a home or other structure. A second 120 VAC relay manages power routed from a second 120 VAC cord and plug wherein the plug is plugged into a second 120 VAC outlet which is powered on a different supply phase than the outlet of the first 120 VAC plug and cord. As an additional safety measure, the invention further includes a circuit breaker that is configured within the electrical plug of either or both of the 120 VAC plugs employed in converting 120 VAC power for use in a 240 VAC capacity.

The two 120 VAC cords are plugged into 120 VAC outlets in the walls of a home or structure that are of different electrical supply phases otherwise, there is no actual conversion of the power to 240 VAC power. Once a user plugs the two 120 VAC cords and plugs into 120 VAC outlets that are out of phase with one another, the power supplied is transferred through at least two electrical relays, the relays managing a plurality of coils and electrical switches that route the power to a 240 VAC relay. The 240 VAC relay includes a plurality of coils and switches that manage the power incoming from the 120 VAC relays and routes the power to a 240 VAC outlet for use in powering 240 VAC-requiring equipment or appliances.

The invention described herein employs one or more electrical relays. As known in the electrical arts, a relay is an electrically operated switch. Many relays use an electromagnet to mechanically operate a switch, but other operating principles are also used, such as solid-state relays. Relays are used where it is necessary to control a circuit by a low-power signal (with complete electrical isolation between control and controlled circuits), or where several circuits must be controlled by one signal.

It will be understood by those of ordinary skill in the art that there exists numerous types of relays and coils all of which are encompassed within the scope of the present invention and patent claims including those described herein. As a preferred embodiment of the present invention, relays employed herein include for example, 110, 120 VAC relays with 20 ampere contacts as well as 220, 240 VAC relays with 20 amp contacts. The invention can also be used in Europe, and around the world to provide a doubling of amperage (versus doubling of voltage in the U.S.). With regard to amperage in Europe, and other parts of the world, voltage is sufficient however amperage is not. Therefore, in these cases the invention employs two separate electrical outlets to double the amperage, not the voltage. By way of example, in Europe the voltage is 220/240 and the amperage is 10 amps. In such a case, the invention is employed to combine two separate outlets to make 20 amps @220/240 volt. In the U.S. using the invention, a user combines two 110/120 volt 20 amp outlets to make one circuit of 20 amps @220/240, so those of pertinent skill in the art will understand that the outcome is essentially the same.

Further, the invention can also be employed in a three phase application. By way of example: In a commercial application one can employ use of the invention for three separate outlets of 110/120 VAC in order to make a 208/220/240 volt three phase plug. As described above as well as below, the invention can also be employed in order to power traditional plug and play technology.

The installation methods, including use with a Plug and Play as well as in fast charging of vehicle electrical batteries further allow a user to employ the device in any number of household and automobile applications. The invention further includes a safety measure and device in the form of an electrical plug circuit breaker that includes a bimetallic strip and a reset button that establishes the connection of cord wiring with a plurality of electrical contacts configured near the reset button. The plug circuit breaker establishes an in-line connection within one of the cord wires that routes power to an appliance or piece of equipment. In instances in which the plug wiring gets dangerously hot, or is at risk of causing a fire, the plug circuit breaker breaks the connection in the cord wiring thus, interrupting the electrical connection being routed through the plug. When the plug circuit breaker is reset, the contacts of the plug wiring are closed and electrical power is again routed through the wiring to provide power to an appliance requiring energy.

Installation of the electrical system invention is simple and requires no instructions other than basic details for use since to use the invention, a user only needs to be plug the two 120 VAC cords and plugs into two separate 120 VAC outlets that are supplied by two different electrical phases.

It is therefore, a primary object of the present invention to provide an electrical system device and method of employing the claimed invention in a variety of applications including but not limited to charging of vehicle electrical batteries such as those installed in plug-in and all-electrical vehicles, Plug and Play devices, solar and other alternative energy generators and other technologies as are known in the art.

The electrical system device and method further includes a system that lacks the two 120 VAC plugs and cords and merely provides 120 VAC outlets allowing a user to supply his own cords to connect to the central housing unit of the invention. In other words, with regard to this particular embodiment, the invention is configured with three outlets in total, two for 120 VAC power and one 240 VAC outlet, all the outlets available to be fitted with electrical cords by a user. The system and methods of the invention also include use of the device with so-called Plug and Play devices to provide, for example, electrical power generated from a solar panel or solar cell.

As used herein, the term "connected" refers to the general and known understanding of the term as it relates to the electrical field. For example, understanding of the term includes an electrical connection between two electrical components wherein either an electrical circuit is created when power is present or alternatively, a circuit is interrupted under certain circumstances wherein the electrical components no longer connected to form a circuit to carry power.

As used herein, the term "structure" refers to any building, or manufactured facility that possesses and electrical system that includes 120 VAC power. For example, a home provides outlets that deliver 120 VAC power when an appliance is plugged into the outlet. The structure in this example includes a home, a commercial building or any other structure that is wired to deliver 120 VAC power to an appliance or equipment.

Turning now to the substance of FIGS. 1 to 8 and the preferred embodiments of the invention.

FIG. 1 represents the condition of the present invention in which both 120 VAC plugs are not connected to a supply. The two 120 VAC plugs are indicated at the bottom of the Figure 10, 12, the 240 VAC outlet, 14, is at the top. Each three-prong plug has a ground wire 40, a neutral wire 50 and a hot, or supply, wire 60, 70. Connection of these prongs to the corresponding wires in the 120 VAC outlets (not shown) is enforced by the physical configuration of the 120 VAC plugs. Neutral 50 and hot, or supply lines 60, 70 within the present invention indicates respectively circuits that may, under certain conditions-specifically the state of the relays—be connected, but are not necessarily always connected. For example, not all supply lines on the diagram represent one continuously connected electrical circuit.

Tracing through the circuit, the ground wires 50 of both 120 VAC plugs and the 240 VAC outlet 14 are always connected. This is correct and necessary to maintain a safe condition. The hot and neutral wires from both 120 VAC plugs are connected to a series of relay windings and coils. Aided by the symmetry in the figure, both 120 VAC plugs 10, 12 are treated exactly the same in the present invention and are functionally and operationally identical. As shown in the Figure, the switches are all open and in this unconnected condition, there is no voltage anywhere in the circuit.

Figure 2:
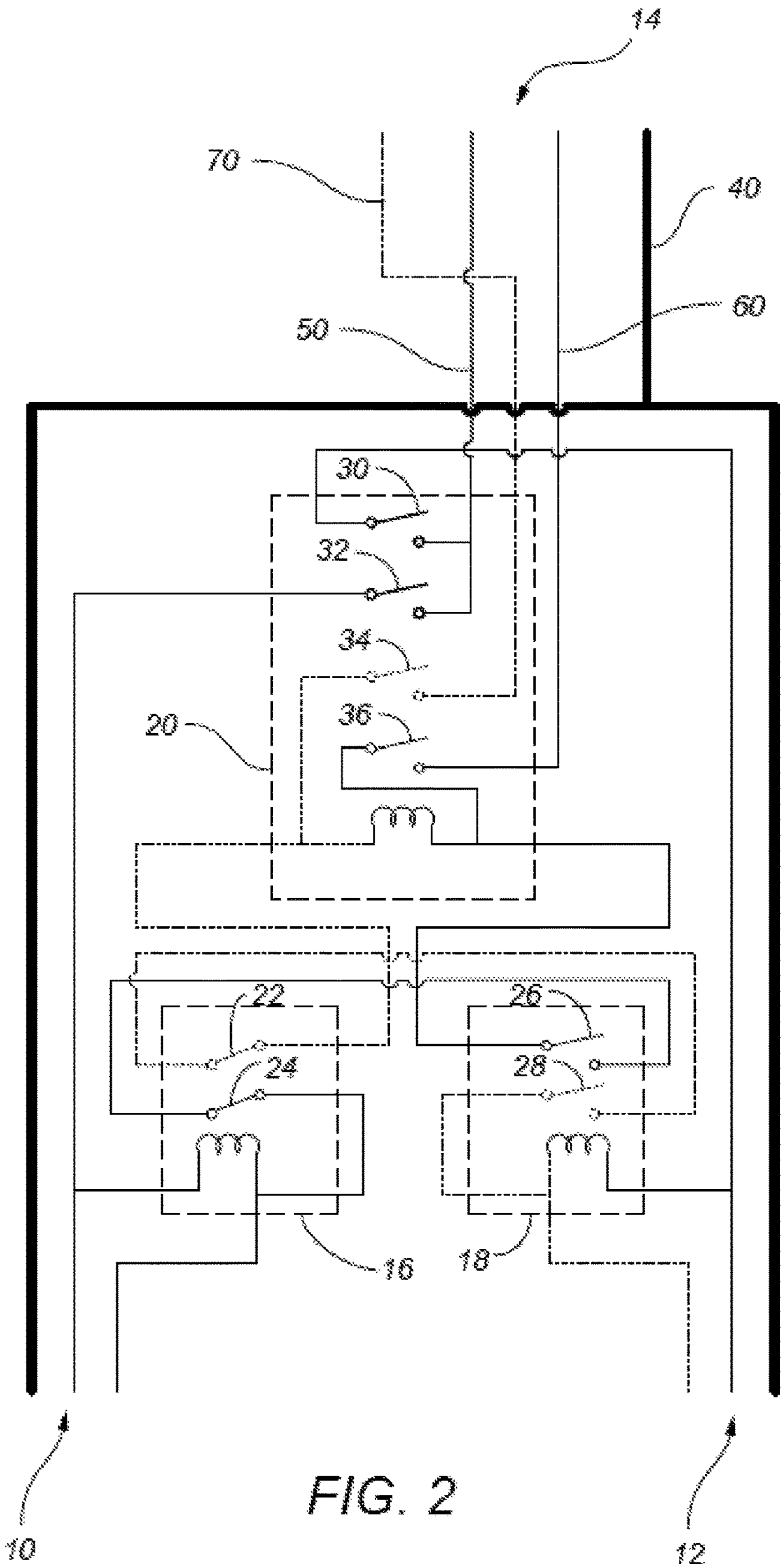
FIG. 2 depicts the overall configuration of the present invention. In particular, the illustration provides the electrical schematic associated with transfer of electrical power from two 120 VAC cord and plug connections to a 240 VAC outlet. As shown, switches controlled by the 240 VAC relay and the lower right 120 VAC relay are open and switches controlled by the lower left 120 VAC relay are closed.

FIG. 2 represents the condition of the present invention wherein a first 120 VAC cord and plug 10 has been connected to its supply, but a second 120 VAC cord and plug 12 is not connected. The change from FIG. 1 is that the contacts of the relay closest to the first 120 VAC cord and plug 10 are shown in the closed or energized position. This occurs because the hot and neutral wires of the first 120 VAC plug are supplying power to the coil of that relay, closing its contacts. Following the first 120 VAC cord 10 hot wire through the contacts of the relay, the illustration provides that path ending at an unconnected contact of the relay nearest the second 120 VAC plug 12. Following a branch off the first 120 VAC plug neutral wire, the wire ends at an open contact of the relay near the top of the figure. There is no opportunity for either the hot or neutral wires of the first 120 VAC plug wire to be connected in this state to any of the prongs of the second 120 VAC plug wire or to the 240 VAC wire and outlet 14. A similar chain of reasoning would apply if the second 120 VAC plug was connected to its supply and the first 120 VAC plug was unconnected.

Figure 3:
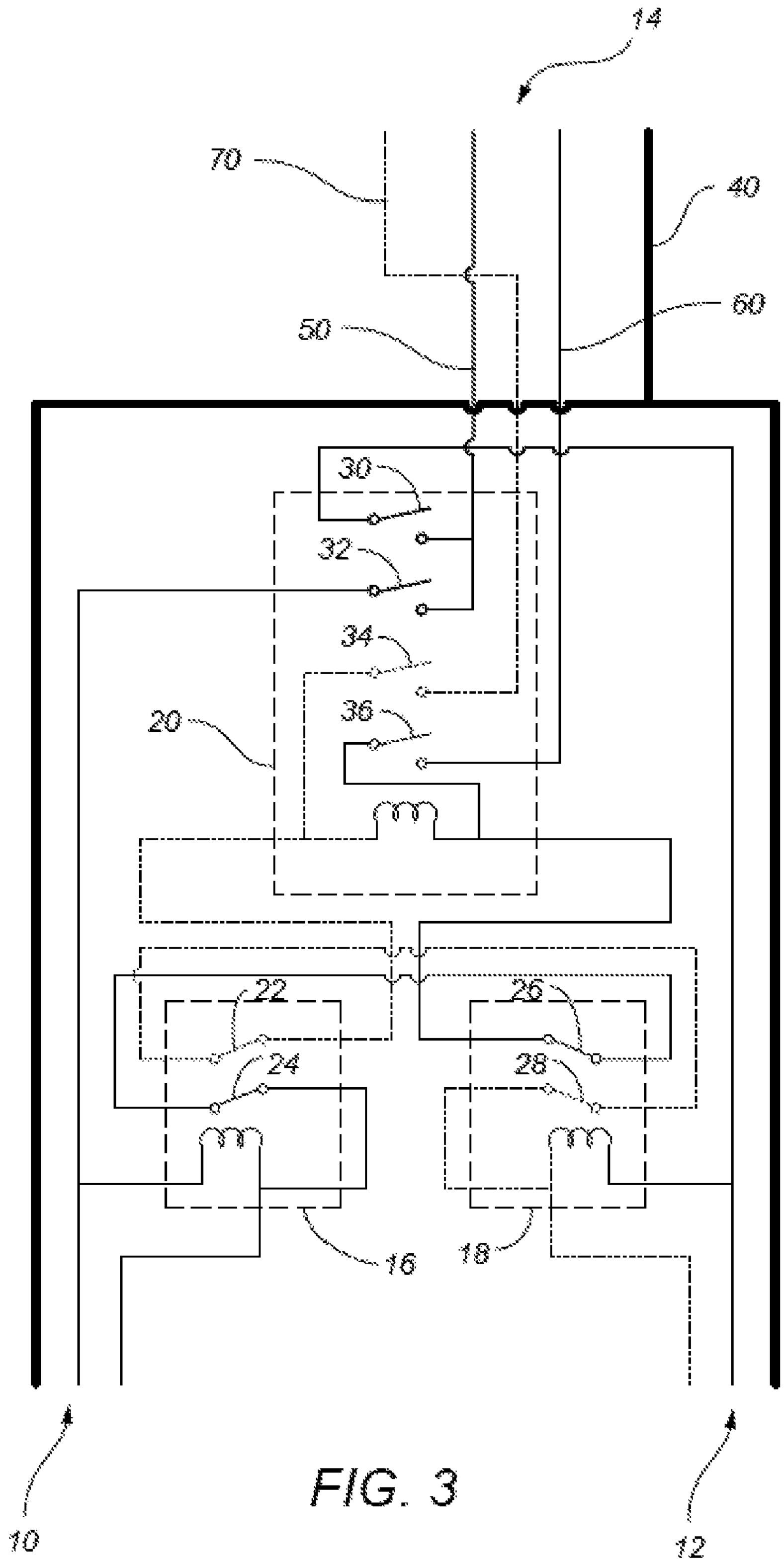
FIG. 3 depicts the overall configuration of the present invention. In particular, the illustration provides the electrical schematic associated with transfer of electrical power from two 120 VAC cord and plug connections to a 240 VAC outlet. As shown, switches controlled by the 240 VAC relay are open and switches controlled by the lower 120 VAC relays are closed.

FIG. 3 represents the condition of the present invention when both the first and second 120 VAC plugs have been connected to their respective supplies, with the supplies being of different phases. Under normal conditions, the situation in FIG. 3 exists only for an instant; the present invention is in a transient on its way to the fully connected condition that will be described with the help of FIG. 4. However, in FIG. 3, the two lower relays 16, 18 are energized, but the top relay is not yet energized. The neutrals from both the first and second 120 VAC plugs and cords help to energize their respective relays and also branch to contacts 30, 32, 34, 36 in the top relay that are still open. The first 120 VAC hot wire energizes its relay 16 and also continues through the closed contacts of that relay to a contact in the relay closest to the second 120 VAC plug and cord 18. Those contacts are now closed, so the first 120 VAC hot wire continues through that contact to one side of the coil for the top relay.

The second 120 VAC plug hot wire 70 follows a corresponding course, first though the contacts of its own relay 20 then through the contacts of the first 120 VAC relay 16 and on to the other side of the winding for the top relay 20. Having the hot connections from two different phases connected to its winding is sufficient to activate the top relay, so FIG. 3 shows the state of the present invention in the instant before the contacts of the top relay close. In effect, the relays are wired to perform a logical and; the first 120 VAC plug and cord must be connected and the second 120 VAC plug and cord must be connected to supply power to the coil of the top relay. In this transient state, neither of the hots are connected to 240 VAC outlet, nor are the neutrals.

There is a set of conditions under which the situation depicted in FIG. 3 is not a transient but endures indefinitely until connections at the first and second 120 VAC plugs and cords are changed. One of these conditions occurs when the first and second 120 VAC plugs have been connected to the same phase of the electrical supply. In this case, the contacts of the two lower relays 16, 18 close, but both ends of the coil of the upper relay 20 are connected to the same phase and therefore the same voltage; this will not energize the upper relay and its contacts remain open. The other conditions under which the situation in FIG. 3 will persist is if either or both of the outlets that the first and second 120 VAC plugs have been connected to are incorrectly wired. It is explicitly against electrical code, but it does occasionally happen that outlets are wired with the hot and neutral connections reversed. Suppose this has happened at one outlet but not the other.

Then 120 VAC will appear at one end of the coil of the upper relay and neutral will appear at the other end. Though this was sufficient to energize the two lower relays, the upper relay is specified to close its contacts only if at least 240 VAC wire appears across its coil, so its contacts remain open and no voltages are connected to the 240 VAC outlet. Crucially, the "neutral" wires from both plugs are not connected to each other, which would otherwise trip a breaker at least and possibly cause damage or fire. There are even more ways that outlets can be mis-wired involving incorrect assignment of the ground, but none of these mistakes will allow sufficient voltage to energize the top relay either.

Figure 4:
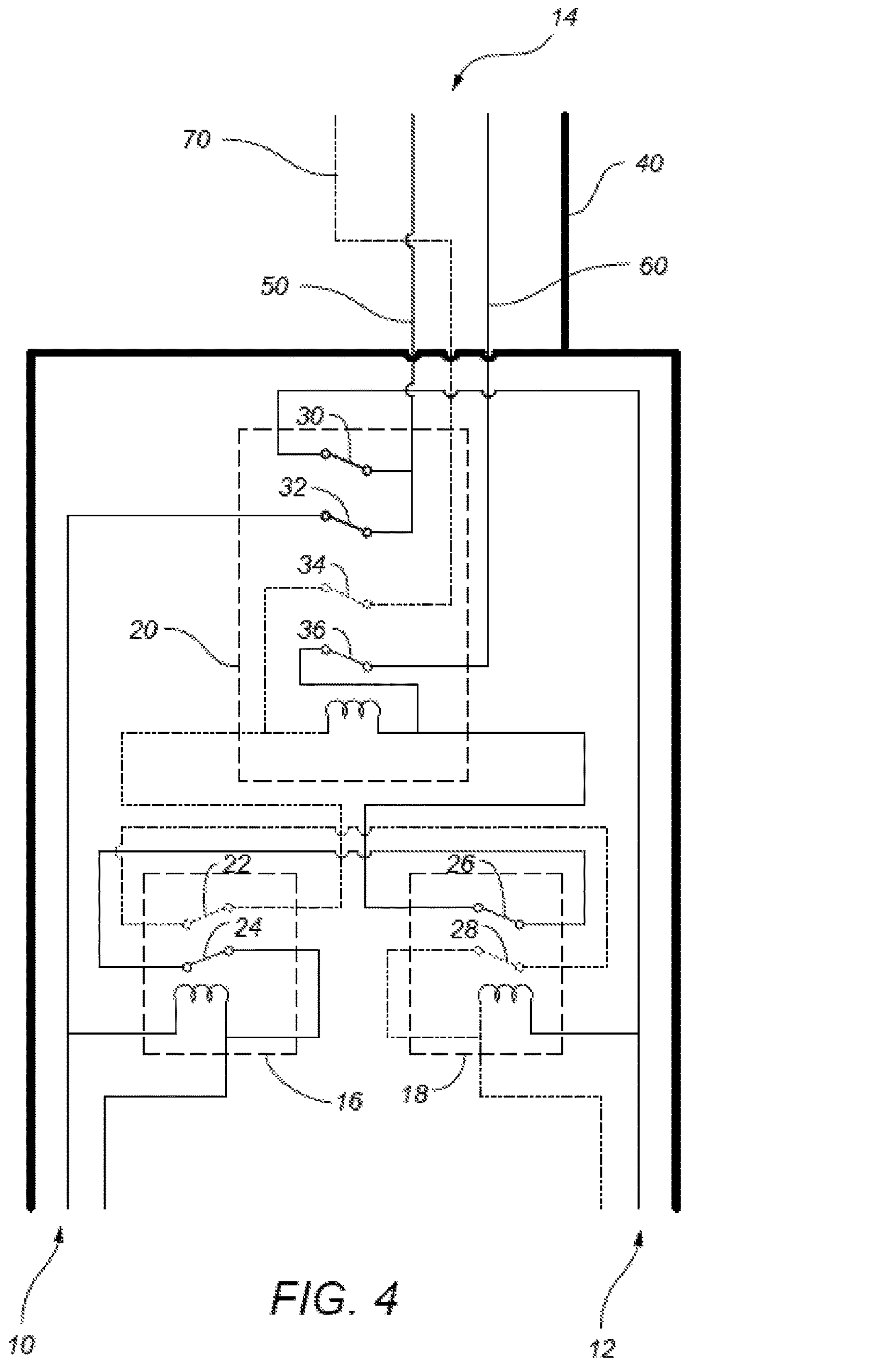
FIG. 4 depicts the overall configuration of the present invention. In particular, the illustration provides the electrical schematic associated with transfer of electrical power from two 120 VAC cord and plug connections to a 240 VAC outlet. As shown, switches controlled by the 240 VAC relay and the two 120 VAC relays are closed.

FIG. 4 represents the steady-state, persistent condition when the first and second 120 VAC plugs and cords are connected to different phases of the electrical supply. The top relay has 240 VAC applied across its coil, its contacts are closed 30, 32, 34, 36, and this is the only condition under which voltages appear at the 240 VAC outlet. The hot from the first 120 VAC plug appears at one hot for the 240 VAC outlet, the hot from second 120 VAC plug and cord appears at the other hot on the 240 VAC outlet. The neutrals from the first and second 120 VAC plugs and cords are connected together through the contacts of the top relay, and on to the neutral of the 240 VAC outlet. As noted earlier, the grounds of all three plugs are permanently connected. If at any time the second 120 VAC plug and cord becomes disconnected from its supply, the present invention will immediately revert to the situation depicted in FIG. 2. If the first 120 VAC plug becomes disconnected while the second 120 VAC plug remains connected, a similar state will apply. In either partially disconnected situation, the top relay will de-energize, its contacts will open, and no voltages will appear at the 240 VAC outlet nor at any of the prongs of the disconnected plug.

Figure 5:
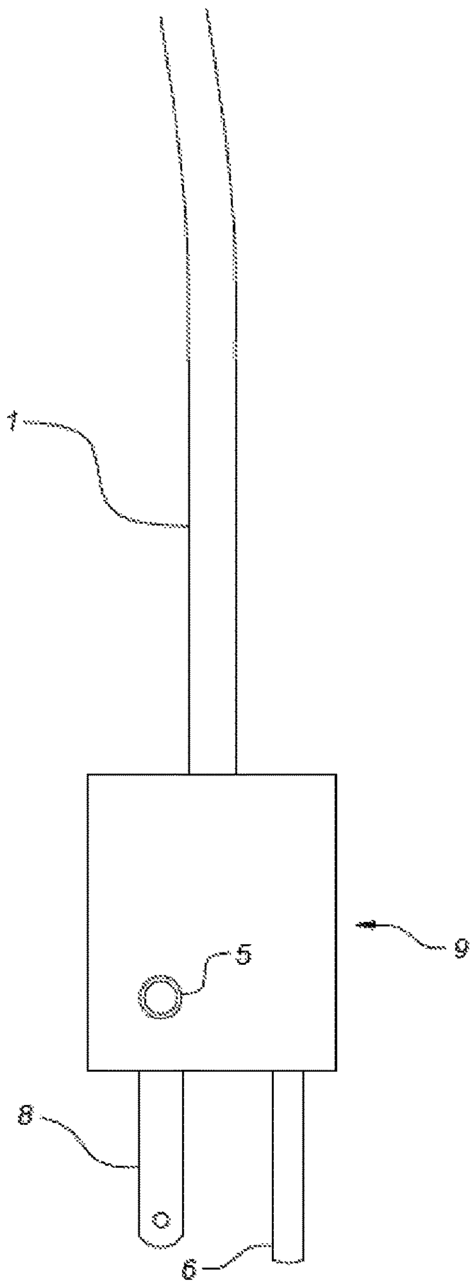
FIG. 5 depicts a side view of a plug circuit breaker wherein the breaker button is shown one side of an electrical plug.
Figure 6:
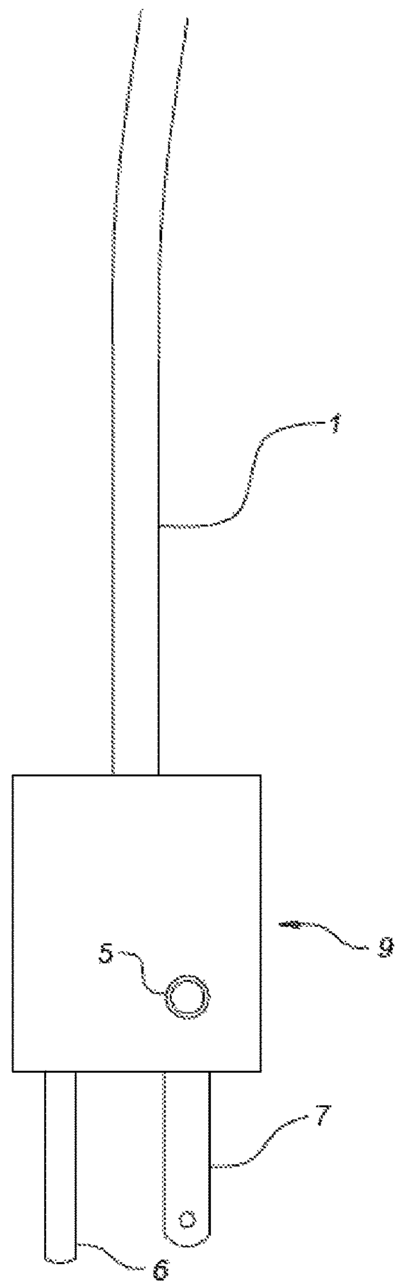
FIG. 6 depicts a second side view perspective of a plug circuit breaker of the invention where the breaker button is shown on the opposite side of an electrical plug illustrating that the plug circuit breaker can be configured to any one of the wires within the plug.

FIG. 5 illustrates a preferred embodiment of the 120 VAC plugs that provides a safety measure in practicing the electrical system of the invention. The Figure provides a plug 9 configured with an internal plug circuit breaker and reset button 5. As shown, the cord 1 is shown from a side view perspective and provides a neutral side electric probe 8 as well as a grounding probe 6 as is typically known in the art. The circuit breaker (not shown) is fitted with a reset button 5 configured on the side of the plug 9. FIG. 6 illustrates the opposite side view perspective of the plug circuit breaker. In particular, a cord 1, which can be 120 VAC or otherwise, leads to a plug 9 configured with a hot side electric probe 7 as well as a ground probe 6. The reset button 5 for the plug circuit breaker in this illustration is on the side of the plug 9.

Figure 7B:
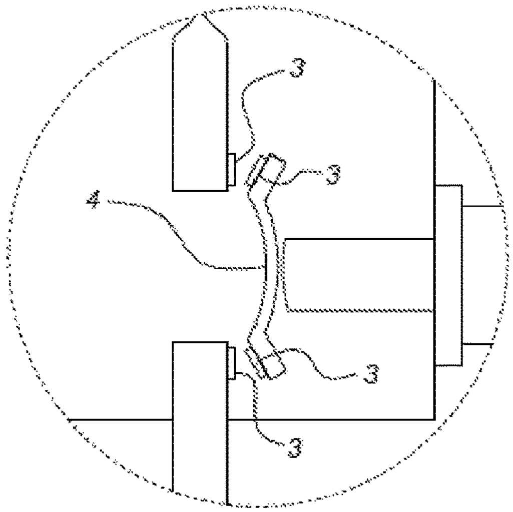
FIG. 7B is a close up illustration of the electrical circuit breaker of FIG. 7A. In particular, the illustration shows the bimetallic contacts in an open position indicating that a circuit cannot be established.
Figure 7A:
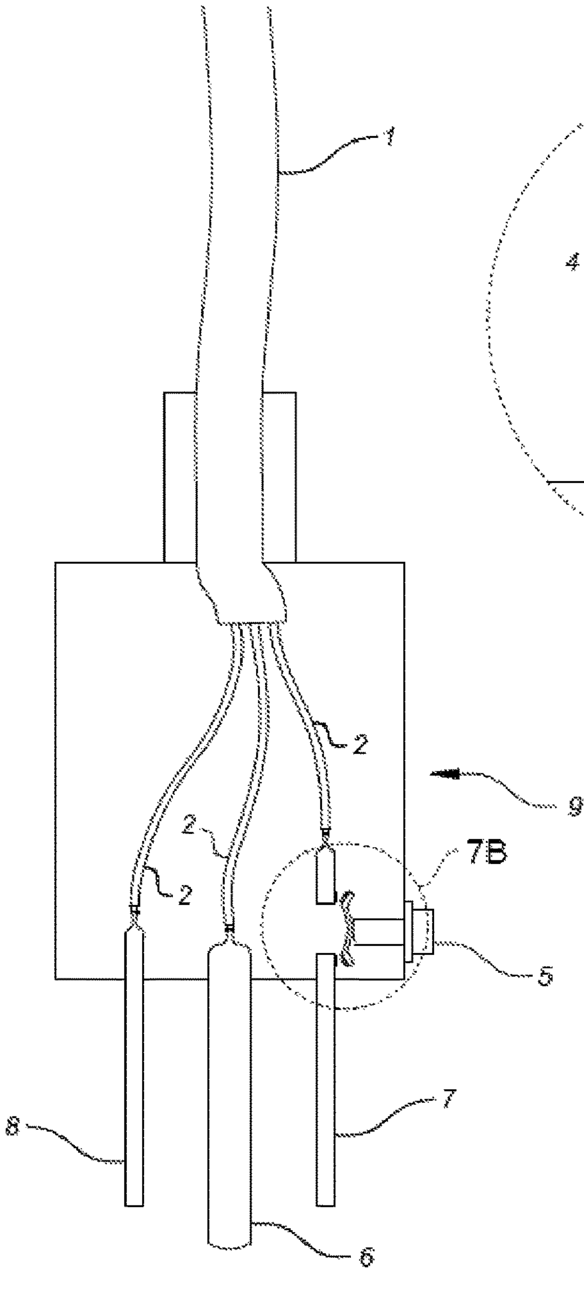
FIG. 7A illustrates a through view of an electrical plug including its wiring thereof wherein the plug circuit breaker is electrically configured into one of the existing wires of the plug. The illustration depicts the three electric wires typically configured within a electric plug wherein one electrical wire is further configured with an electrical breaker. As shown, bimetallic electrical contacts of the breaker are not closed.

FIGS. 7A and 7B illustrate the internal configurations of a preferred embodiment of the plug circuit breaker of the invention. A cord 1 is connected to a plug 9, wherein the cord includes the typical 3-wire configuration for electrical conductance 2. The plug is shown from a top or bottom view perspective and includes a neutral side 8, hot side 7 and grounding electric probe 6. The plug circuit breaker is shown connected to one of the cord wires 2 wherein the reset button 5 is configured to close the contacts of the breaker. FIG. 7B is an expanded view of the plug circuit breaker wherein a bimetallic strip 4 creates a set of contacts between the two contact leads of the cord wire 2. Several contacts 3 form the ends of the bimetallic strip so that when closed, the contacts establish an electrical connection for transfer of electricity through the wire.

Figure 8B:
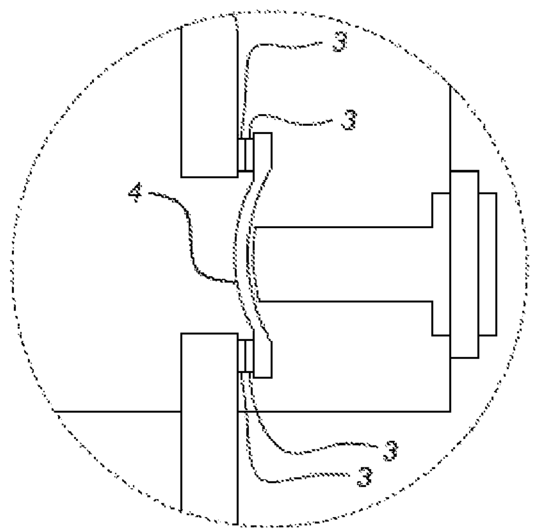
FIG. 8B illustrates a close up view of the plug circuit breaker wherein the contacts of the bimetallic wire are closed, having been closed by the reset button on the side of the plug. Accordingly, electricity is allowed to transfer to the plug elements.
Figure 8A:
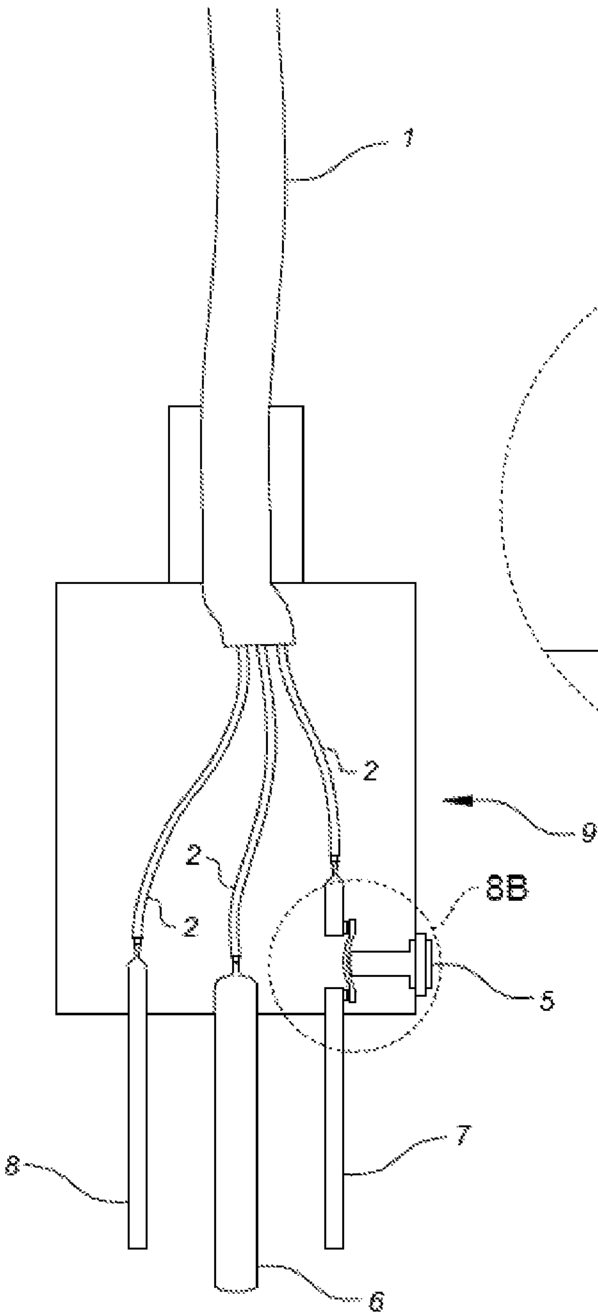
FIG. 8A illustrates a through view perspective of the electrical plug of FIGS. 7A and B and includes the typical wiring a traditional plug wherein a plug circuit breaker is electrically configured into one of the wires of the plug. The plug circuit breaker is shown on the side of the plug.

FIGS. 8A and 8B illustrate a preferred embodiment of the plug circuit breaker wherein the contacts 3 of the breaker are closed. Again, the cord is configured with a hot side 7, neutral side 8 and ground probe 6 that are connected to wires 2 in the cord 1. The plug circuit breaker reset button 5 is configured on the side of the plug 9. FIG. 8B is an expanded view perspective of the plug circuit breaker and illustrates the bimetallic strip 4 with the contacts 3 closed by the reset button, allowing transfer of electrical power through the wire.

To manufacture the electrical system of the present invention, traditional electrical manufacturing methods are employed. Electrical relays, switches and coils as are known in the art are manufactured and assembled according to the specification herein.

Benefits of the present invention over the prior art include a user's ability to charge their electrical batteries with 240 VAC power routed from two 120 VAC power plugs and outlets. Accordingly, charge time is greatly decreased. Moreover, employing use of the electrical system in conjunction with plug and play technology allows a user to route power generated from alternative energy sources to a home in need of such power or alternatively, back to the electrical power grid, thus, lowering the user's energy bills.

Although the invention has been described with reference to the above examples, it will be understood that modifications and variations are encompassed within the spirit and scope of the invention. Accordingly, the invention is limited only by the following claims.

What is claimed is:

1. An electrical power adapter configured to combine two electrical inputs to produce an electrical output at a voltage substantially equal to a sum of voltages of the two electrical inputs, the adapter comprising:

a first normally open relay operably connected to a first electrical input and comprising a coil of the first normally open relay and two contacts of the first normally open relay, and the two contacts of the first normally open relay closing only when the coil of the first normally open relay is energized at a first voltage from the first electrical input provided at a first phase;

a second normally open relay operably connected to a second electrical input and comprising a coil of the second normally open relay and two contacts of the second normally open relay, and the two contacts of the second normally open relay closing only when the coil of the second normally open relay is energized at a second voltage from the second electrical input provided at a second phase; and a third normally open relay operably connected to both the first and second normally open relays and comprising a coil of the third normally open relay and four contacts of the third normally open relay, and the four contacts of the third normally open relay closing when the coil of the third normally open relay is energized at a third voltage, the third voltage being the sum of the first voltage and the second voltage.

2. The adapter of claim 1, wherein the first and second electrical inputs are configured with a plug circuit breaker.

3. The adapter of claim 2 wherein the plug circuit breaker includes a reset button, wherein the reset button, when pushed, closes electrical contacts to establish an electrical connection and the plug circuit breaker breaks an established electrical circuit during instances in which excessive heat is generated, the excessive heat being in excess of safe operating levels.

4. The adapter of claim 1, wherein the first and second electrical inputs comprise electrical cords with a length to span a distance within a home or establishment so that the electrical cords can be plugged into two 120 VAC electrical outlets that operate on different electrical phases.

5. The adapter of claim 1, wherein the adapter comprises an electrical outlet, the electrical outlet comprising a ground line, a neutral line, a hot line at the first voltage and the first phase, and a hot line at the second voltage and the second phase.

6. The adapter of claim 5, wherein the electrical outlet is configured to fit a standard 240 VAC plug.

7. The adapter of claim 5, wherein the electrical outlet is configured to fit any 240 VAC plug.

8. The adapter of claim 1, wherein the two contacts of the first normally open relay close only when the coil of the first normally open relay is energized at a first voltage value equal to or greater than 120 VAC, and wherein the two contacts of the second normally open relay close only when the coil of the second normally open relay is energized at a second voltage value equal to or greater than 120 VAC.

9. The adapter of claim 8, wherein the four contacts of the third normally open relay close only when the coil of the third normally open relay is energized at a third voltage value equal to or greater than 240 VAC.

10. The adapter of claim 1, wherein closing the two contacts of the first normally open relay allows the coil of the third normally open relay to be energized by the second voltage, and wherein closing the two contacts of the second normally open relay allows the coil of the third normally open relay to be energized by the first voltage.

11. The adapter of claim 1, wherein the adapter comprises an electrical outlet, the electrical outlet comprising a hot line at the first voltage and the first phase, and a hot line at the second voltage and the second phase.

12. The adapter of claim 1, wherein the adapter comprises a first cord comprising the first electrical input and a second cord comprising the second electrical input.

13. The adapter of claim 1, wherein the adapter comprises a central housing, the first electrical input comprising a first outlet located in the central housing and the second electrical input comprising a second outlet located in the central housing.

14. The adapter of claim 13, wherein the adapter comprises a third outlet located in the central housing.

15. The adapter of claim 13, wherein the adapter does not include an external cord extending between the first electrical input and the central housing.

16. The adapter of claim 1, wherein when one of the first electrical input or second electrical input is connected to an outlet, no voltage appears on contacts of the other of the first electrical input or second electrical input.

17. The adapter of claim 1, wherein each of the first electrical input and the second electrical input comprises a plug having prongs, and wherein when one of the first or second electrical input is inserted into an outlet, no voltage appears on the prongs of the other of the first electrical input or second electrical input.

* * * * *